(12) United States Patent
Sivaraman et al.

(10) Patent No.: US 10,129,709 B1
(45) Date of Patent: Nov. 13, 2018

(54) METHOD AND APPARATUS FOR FADING PROFILE DETECTION

(71) Applicant: MBIT WIRELESS, INC., Irvine, CA (US)

(72) Inventors: Krishnavelan Sivaraman, Puducherry (IN); Akshayavarnikha Muthuraj, Pondicherry (IN); Karthik Thirukannan, Puducherry (IN); Keerthivasan Suresh, Chennai (IN)

(73) Assignee: MBIT WIRELESS, INC., Irvine, CA (US)

( * ) Notice: Subject to any disclaimer, the term of this patent is extended or adjusted under 35 U.S.C. 154(b) by 167 days.

(21) Appl. No.: 15/210,119

(22) Filed: Jul. 14, 2016

(51) Int. Cl.
*H04W 4/06* (2009.01)
*H04L 29/08* (2006.01)
*H04W 24/10* (2009.01)

(52) U.S. Cl.
CPC .............. *H04W 4/06* (2013.01); *H04L 67/30* (2013.01); *H04W 24/10* (2013.01)

(58) Field of Classification Search
CPC .......... H04W 4/06; H04W 24/10; H04L 67/30
See application file for complete search history.

(56) References Cited

U.S. PATENT DOCUMENTS

| 9,313,002 | B1 * | 4/2016 | Balraj | H04L 5/0048 |
| 2007/0258366 | A1 * | 11/2007 | Imamura | H04L 5/0046 370/230 |
| 2009/0141786 | A1 * | 6/2009 | Park | H04L 27/2647 375/227 |
| 2011/0176499 | A1 * | 7/2011 | Siomina | G01S 1/042 370/329 |
| 2014/0241232 | A1 * | 8/2014 | Damji | H04L 25/0204 370/312 |
| 2018/0013592 | A1 * | 1/2018 | Liu | H04L 25/0208 |

\* cited by examiner

*Primary Examiner* — Alex Skripnikov
*Assistant Examiner* — Sharmin Chowdhury
(74) *Attorney, Agent, or Firm* — Lerner, David, Littenberg, Krumholz & Mentlik, LLP

(57) ABSTRACT

Fading profile detection may be used in many wireless communication system receivers to perform improved channel estimation and decoding. Delay spread may be very high for some fading profiles and hence the coherence bandwidth may be very limited for these fading profiles. It may not be possible to reliably differentiate high delay spread fading profiles from low and mid delay spread fading profiles by the conventional delay spread estimation techniques. A method and apparatus are disclosed that can identify and differentiate high delay spread fading profiles from the low and mid delay spread fading profile to perform improved channel estimation and decoding of the received data.

17 Claims, 23 Drawing Sheets

FIG. 2
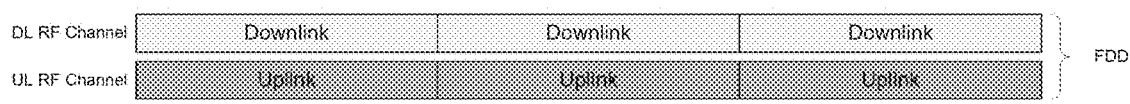

(An MBSFN reserved cell )
A cell that does not support
MBSFN transmission

FIG. 7

| Extended Delay Spread ||
|---|---|
| Maximum Doppler frequency [5Hz] ||
| Relative Delay [ns] | Relative Mean Power [dB] |
| 0 | 0 |
| 30 | -1.5 |
| 150 | -1.4 |
| 310 | -3.6 |
| 370 | -0.6 |
| 1090 | -7 |
| 12490 | -10 |
| 12520 | -11.5 |
| 12640 | -11.4 |
| 12800 | -13.6 |
| 12860 | -10.6 |
| 13580 | -17 |
| 27490 | -20 |
| 27520 | -21.5 |
| 27640 | -21.4 |
| 27800 | -23.6 |
| 27860 | -20.6 |
| 28580 | -27 |

FIG. 12

| MBSFN 5Hz channel parameters | |
|---|---|
| Maximum Delay spread | 28580 ns |
| RMS delay spread | 4364 ns |
| Coherence Bandwidth (Subcarriers) $\approx \dfrac{1}{\Delta f * Maximum\ Delay\ spread}$ | 2.43 |
| Maximum Doppler spread | 5 Hz |
| Coherence time $\approx \dfrac{1}{Maximum\ Doppler\ spread}$ | 31 ms |

FIG. 16

| Fading Profile | Configured SNR (dB) | Mean of SNR | | |
|---|---|---|---|---|
| | | SNR1: RS symbol(2,6) (dB) | SNR2: RS symbol(2,10) (dB) | Delta_SNR (dB) |
| EPA 5 | 30 | 31.5 | 31.4 | -0.1 |
| | 25 | 26 | 25.9 | -0.1 |
| | 20 | 17.5 | 17.5 | 0 |
| | 15 | 13.3 | 13.3 | 0 |
| | 10 | 9.1 | 9.1 | 0 |
| | 5 | 4.9 | 4.8 | 0 |
| | 0 | -2.8 | -2.8 | 0 |
| EVA 70 | 30 | 23.1 | 17.8 | -5.3 |
| | 25 | 20.8 | 16.8 | -4 |
| | 20 | 17.2 | 15.1 | -2.1 |
| | 15 | 13.2 | 12.1 | -1.1 |
| | 10 | 8.2 | 7.8 | -0.4 |
| | 5 | 3.7 | 3.5 | -0.2 |
| | 0 | -1.4 | -1.5 | -0.1 |
| ETU 300 | 30 | 10.3 | 3.6 | -6.8 |
| | 25 | 10.2 | 3.5 | -6.7 |
| | 20 | 9.7 | 3.5 | -6.2 |
| | 15 | 8.4 | 2.7 | -5.7 |
| | 10 | 6.1 | 1.8 | -4.3 |
| | 5 | 2.5 | -0.4 | -2.9 |
| | 0 | -2.1 | -4 | -2 |
| MBSFN 5 | 30 | 11.9 | 29.5 | 17.6 |
| | 25 | 12 | 25 | 13 |
| | 20 | 12.7 | 20.6 | 7.9 |
| | 15 | 10 | 15.2 | 5.2 |
| | 10 | 7.4 | 9.4 | 2 |
| | 5 | 4.5 | 5.6 | 1.1 |
| | 0 | -0.1 | 0.4 | 0.5 |
| MBSFN 70 | 30 | 12.5 | 18 | 5.4 |
| | 25 | 12 | 17 | 5 |
| | 20 | 11.9 | 15.7 | 3.8 |
| | 15 | 10.6 | 13.2 | 2.6 |
| | 10 | 7.9 | 9.3 | 1.3 |
| | 5 | 3.8 | 4.4 | 0.7 |
| | 0 | -0.4 | 0.1 | 0.4 |

FIG. 17

| Fading Profile | Configured SNR (dB) | Fluctuation of SNR | | |
|---|---|---|---|---|
| | | SNR1: RS symbol(2,6) (dB) | SNR2: RS symbol(2,10) (dB) | Delta_SNR (dB) |
| EPA 5 | 30 | 13.1 | 13.4 | 1.2 |
| | 25 | 16 | 16.1 | 0.8 |
| | 20 | 14.7 | 14.6 | 0.3 |
| | 15 | 7.6 | 7.5 | 0.3 |
| | 10 | 10.7 | 10.7 | 0.3 |
| | 5 | 11.9 | 11.9 | 0.4 |
| | 0 | 7.2 | 7.1 | 0.8 |
| EVA 70 | 30 | 6.5 | 3.8 | 4.3 |
| | 25 | 4.4 | 3.8 | 2.3 |
| | 20 | 4.4 | 4 | 1.5 |
| | 15 | 4.1 | 3.6 | 0.8 |
| | 10 | 4.1 | 4 | 0.5 |
| | 5 | 3.9 | 3.9 | 0.5 |
| | 0 | 3.8 | 3.7 | 0.7 |
| ETU 300 | 30 | 1.8 | 2.2 | 1.2 |
| | 25 | 1.7 | 2.2 | 1.2 |
| | 20 | 1.7 | 2.1 | 1.2 |
| | 15 | 1.3 | 2.2 | 1.4 |
| | 10 | 1.2 | 1.9 | 1.4 |
| | 5 | 1.8 | 2 | 1.3 |
| | 0 | 1.7 | 1.8 | 1.2 |
| MBSFN 5 | 30 | 8.5 | 15.9 | 16.3 |
| | 25 | 9.3 | 16.4 | 13.5 |
| | 20 | 10.3 | 8.2 | 8.9 |
| | 15 | 7.2 | 7.3 | 5.6 |
| | 10 | 8.8 | 8.4 | 2.7 |
| | 5 | 7 | 7.1 | 1.4 |
| | 0 | 7.4 | 7.3 | 0.8 |
| MBSFN 70 | 30 | 4.5 | 3.9 | 5 |
| | 25 | 4.2 | 3.2 | 4.4 |
| | 20 | 3.8 | 3.1 | 3.4 |
| | 15 | 3.6 | 3.1 | 2.3 |
| | 10 | 3.5 | 3.1 | 1.3 |
| | 5 | 3.7 | 3.4 | 0.8 |
| | 0 | 4.6 | 4.4 | 0.7 |

FIG. 18

| Fading Profile | Configured SNR (dB) | % of detection as MBSFN delay profile | % of detection as non-MBSFN delay profile |
|---|---|---|---|
| EPA 5 | 30 | 0 | 100 |
|  | 25 | 0 | 100 |
|  | 20 | 0 | 100 |
|  | 15 | 0.6 | 99.4 |
|  | 10 | 1.1 | 98.9 |
|  | 5 | 3 | 97 |
|  | 0 | 21.9 | 78.1 |
| EVA 70 | 30 | 0 | 100 |
|  | 25 | 0 | 100 |
|  | 20 | 0 | 100 |
|  | 15 | 0 | 100 |
|  | 10 | 0 | 100 |
|  | 5 | 0.3 | 99.7 |
|  | 0 | 6.6 | 93.4 |
| ETU 300 | 30 | 0 | 100 |
|  | 25 | 0 | 100 |
|  | 20 | 0 | 100 |
|  | 15 | 0 | 100 |
|  | 10 | 0 | 100 |
|  | 5 | 0 | 100 |
|  | 0 | 0 | 100 |
| MBSFN 5 | 30 | 100 | 0 |
|  | 25 | 99.3 | 0.7 |
|  | 20 | 98 | 2 |
|  | 15 | 97.7 | 2.3 |
|  | 10 | 96.9 | 3.1 |
|  | 5 | 99.9 | 0.1 |
|  | 0 | 87.7 | 12.3 |
| MBSFN 70 | 30 | 100 | 0 |
|  | 25 | 99.8 | 0.2 |
|  | 20 | 99.4 | 0.6 |
|  | 15 | 97.6 | 2.4 |
|  | 10 | 88 | 12 |
|  | 5 | 98.1 | 1.9 |
|  | 0 | 84.1 | 15.9 |

METHOD AND APPARATUS FOR FADING PROFILE DETECTION

BACKGROUND

Typically, as shown in FIG. 1, a wireless communication system 10 comprises elements such as client terminal or mobile station (MS) 12 and base stations (BS) 14. Other network devices which may be employed, such as a mobile switching center, are not shown. In some wireless communication systems there may be only one BS and many client terminals while in some other communication systems such as cellular wireless communication systems there are multiple BSs and a large number of client terminals communicating with each BS. The term client terminal is used herein to refer to an MS.

As illustrated, the communication path from the BS to the client terminal direction is referred to herein as the downlink (DL) and the communication path from the client terminal to the BS direction is referred to herein as the uplink (UL). In some wireless communication systems the client terminal communicates with the BS in both DL and UL directions. For instance, this is the case in cellular telephone systems. In other wireless communication systems the client terminal communicates with the BS in only one direction, usually the DL. This may occur in applications such as paging and multicast or broadcast services.

The BS to which the client terminal is communicating with is referred to as the serving BS. In some wireless communication systems the serving BS is normally referred to as the serving cell. While in practice a cell may include one or more BSs. The cells that are in the vicinity of the serving cell are called neighbor cells.

Duplexing refers to the ability to provide bidirectional communication in a system, i.e., from BS to client terminals (DL) and from client terminals to BS (UL). There are different methods for providing bidirectional communication. One of the commonly used duplexing methods is Frequency Division Duplexing (FDD). In FDD wireless communication systems, two different frequencies, one for DL and another for UL are used for communication. In FDD wireless communication system, the client terminals may be receiving and transmitting simultaneously.

Another commonly used method is Time Division Duplexing (TDD). In TDD based wireless communication systems, the same exact frequency is used for communication in both DL and UL. In TDD wireless communication systems, the client terminals may be either receiving or transmitting but not both simultaneously. The use of the Radio Frequency (RF) channel for DL and UL may alternate on periodic basis. For example, in every 5 ms time duration, during the first half, the RF channel may be used for DL while the RF channel may be used for UL during the second half. In some communication systems the time duration for which the RF channel is used for DL and UL may be adjustable and may be changed dynamically.

Yet another commonly used duplexing method is Half-duplex FDD (H-FDD). In this method, different frequencies are used for DL and UL but the client terminals may not perform receive and transmit operations at the same time. Similar to TDD wireless communication systems, a client terminal using H-FDD method must periodically switch between DL and UL operation. All three duplexing methods are illustrated in FIG. 2.

In many wireless communication systems, normally the communication between the BS and client terminals is organized into frames as shown in FIG. 3. The frame duration may be different for different communication systems and normally it may be in the order of milliseconds (ms). For a given communication system the frame duration may be fixed. In a TDD wireless communication system, a frame may be divided into a DL sub-frame and a UL sub-frame such that the communication from BS to the client terminal (DL) direction takes place during the DL sub-frame and the communication from client terminal to network (UL) direction takes place during UL sub-frame on the same RF channel.

Orthogonal Frequency Division Multiplexing (OFDM) systems typically use Cyclic Prefix (CP) to combat inter-symbol interference and to maintain the subcarriers orthogonal to each other under a multipath fading propagation environment. The CP is a portion of the sample data that is copied from the tail part of an OFDM symbol to the beginning of the OFDM symbol as shown in FIG. 4. One or more OFDM symbols in sequence as shown in FIG. 4 are referred as OFDM signal.

Most wireless communication systems may employ some form of framing in the air interface. For example, 10 ms radio frames are used in the 3rd Generation Partnership Project (3GPP) Long Term Evolution (LTE) wireless communication system and each radio frame comprises 10 sub-frames as shown in FIG. 5. Each sub-frame in turn comprises of two slots and each slot comprises of 6 or 7 OFDM symbols depending on the type of CP used as shown in FIG. 5. In 3GPP LTE wireless communication system, two different CP lengths are used and they are referred to as Normal CP with 7 OFDM symbols and Extended CP with 6 OFDM symbols. In wireless communication systems, normally the specific air interface frame structure repeats itself over certain periodicity.

In cellular wireless communication systems, the same frequencies may be used at the same time by BSs in neighboring cells. Therefore, performance of cellular wireless communication systems in many cases is limited by the interference. The interference may occur both in the downlink direction and in the uplink direction. In interference limited cellular wireless communication systems, mainly two types of interference need to be taken into consideration, namely intra-cell interference and inter-cell interference. In intra-cell interference, the source of interference is in the same cell. This could occur, for example, when multiple client terminals are scheduled to receive or transmit on the same frequency resources at the same time. The intra-cell interference may also occur due to leakage from transmission in adjacent channels within a cell. In inter-cell interference, the source of interference is from one or more adjacent cells. It is primarily caused by the use of same frequency in neighbor cells.

In 3GPP LTE wireless communication system, the smallest unit of radio resource that can be allocated to a user for data transmission is called Resource Block (RB). An RB is a time-frequency radio resource that spans over a time slot of 0.5 ms in the time domain and 12 subcarriers of 15 kHz bandwidth each in frequency domain with a total RB bandwidth of 180 kHz. The RB pairs over two consecutive timeslots in time domain may be allocated to a client terminal for data transmission in a Transmission Time Interval (TTI) of 1 ms known as a sub-frame as illustrated in FIG. 5. The basic downlink physical resource may be viewed as a time-frequency resource grid where each Resource Element (RE) corresponds to one OFDM subcarrier during one OFDM symbol interval. For coherent demodulation of downlink physical channels, Reference Signals (RS) are inserted into the OFDM time-frequency grid at regular interval for estimation of the propagation channel. The REs that are used for RS are referred to as RS REs.

In 3GPP LTE wireless communication system, enhanced Multimedia Broadcast/Multicast Service (eMBMS) is defined where multiple synchronized BSs transmit the same data to multiple client terminals. As illustrated in FIG. 6, multiple synchronized BSs may transmit the same eMBMS data to a client terminal.

The eMBMS technique provides an efficient mode of delivery for both broadcast and multicast services over the network. Improved transmission efficiency and coverage is achieved by means of multicell 'single frequency network' operation. This is referred to as Multicast Broadcast Single Frequency Network (MBSFN).

The eMBMS data may be transmitted simultaneously by multiple BSs which are tightly time synchronized. A client terminal may receive multiple versions of the eMBMS signal due to difference in propagation delay of the multiple transmitted signals as it is transmitted by multiple cells. A client terminal may view the eMBMS data reception as if it is from a single cell and each of the received versions as multipath delay components from a single cell.

The eMBMS data transmission takes place via two logical channels: Multicast Control Channel (MCCH) and Multicast Traffic Channel (MTCH). Both the logical channels are mapped on to the transport channel, Multicast Channel (MCH), which is in turn mapped on to the physical channel, Physical Multicast Channel (PMCH). Since the PMCH using MBSFN involves multiple cells, the channel estimation needs to be done separately for PMCH and Physical Downlink Shared Channel (PDSCH). This necessitates separate RS for PMCH reception which is referred as MBSFN RS. Since separate RS are required for PMCH and PDSCH, and to avoid the mix of RS for PMCH and PDSCH in frequency domain, the frequency division multiplexing of PMCH with PDSCH is not supported while time division multiplexing is supported, i.e., in certain sub-frames PDSCH transmission can be done while in other sub-frames PMCH transmission can be done.

The sub-frames which are allocated for MBSFN transmission are termed as MBSFN sub-frames and if a PMCH is mapped to an MBSFN sub-frame, all the RBs are allocated to the PMCH. In order to avoid collision of PMCH with synchronization signals and paging occasions required for normal operation, PMCH transmission is not done in sub-frames 0, 4, 5 and 9 in FDD and 0, 1, 5, and 6 in TDD.

In 3GPP LTE wireless communication system, a propagation channel profile is specified for verifying the PMCH performance and it is referred to herein as MBSFN propagation channel profile. It is specified considering the extended delay spread environment, such that it consists of three truncated Extended Vehicular A (EVA) fading profiles separated by about 12.5 µs and 27.5 µs and attenuated by 10 dB and 20 dB respectively as shown by the table contained in FIG. 7. In FIG. 7, the relative delays of the first six paths correspond to the first truncated EVA fading profile, the relative delays of next six paths correspond to the second truncated EVA fading profile, and the relative delays of the last six paths correspond to the third truncated EVA fading profile. The maximum Doppler frequency for the MBSFN propagation channel profile is specified to be 5 Hz and the profile is more commonly referred to as MBSFN 5. The MBSFN 5 profile simulates PMCH transmission by three cells but the energy from the first two cells combine constructively in a manner similar to multi-path fading because the delayed paths are within the CP duration while the energy from the third cell acts as Inter-Symbol-Interference (ISI) because the delayed paths are outside the CP duration and may set a limit on the maximum achievable Signal-to-Interference plus Noise Ratio (SINR) at the client terminal, which is defined as $$SINR = \frac{\text{Signal power of serving cell}}{\text{noise power} + \text{interference power}}$$

The differences in propagation delay from multiple cells may be considerably greater than the delay spread in a single cell. Use of Extended CP (about 17 µs) in MBSFN data region may help to ensure that the propagation delays with considerable energy remain within the CP at the client terminal receivers, thereby reducing the impact of ISI.

The RS spacing along the frequency axis is reduced in the MBSFN RS compared to the Cell Specific RS (CRS) to support larger delay spread caused by transmission from multiple cells. The MBSFN RS pattern (known as antenna port 4) for 15 kHz subcarrier spacing is shown in FIG. 8 for one RB over one sub-frame. The RS are placed in alternate REs along the entire bandwidth in the OFDM symbols 2, 6, and 10. The exact REs used for RS within an OFDM symbol are identical for OFDM symbols 2 and 10 whereas there is an offset of one RE for RS in OFDM symbol 6.

An example of estimated RS at the receiver, which is the demodulated RS or the pre-filtered RS, of OFDM symbols pairs (2, 6) and (2, 10) along with their known frequency channel response for 15 kHz subcarrier spacing are shown in FIG. 9 and FIG. 10 respectively for MBSFN 5 Hz propagation profile. These figures demonstrate that the RS of OFDM symbols pair (2, 10) are highly correlated whereas the RS of OFDM symbols pair (2, 6) are noticeably less correlated even though OFDM symbol 6 is closer in time to OFDM symbol 2. The larger difference between the RS of OFDM symbols pair (2, 6) is due to the misalignment of the RS RE location in frequency domain with an offset of one RE. The coherency observed between the RS in OFDM symbols pair (2, 10) and the lack of coherency between RS in OFDM symbols pair (2, 6) is utilized in the present disclosure.

The general configuration of the communication system for MBSFN transmission is shown in FIG. 11. Different cells transmit the same data to multiple client terminals. A single stream of data goes through the Forward Error Correction (FEC) processing followed by OFDM processing. The received data undergoes FEC decoding through channel estimation and equalization techniques.

Since the client terminal is unaware of the type of fading involved in the channel, fading profile detection is useful for performing improved channel estimation and DL decoding. The channel parameters for MBSFN propagation fading profile for 15 kHz sub carrier spacing are tabulated in FIG. 12. The maximum delay spread corresponds to the relative delay of the last path with respect to the first path of the MBSFN fading profile and the RMS delay spread corresponds to the root mean square determined from the relative delay and the relative power of all the paths of the MBSFN fading profile as illustrated in FIG. 7. From FIG. 12 it is evident that the coherence bandwidth is very low for MBSFN fading profile. So flat channel response may not be observed between two consecutive RS REs present in the same OFDM symbol. Hence it may not be possible to differentiate the MBSFN fading profile from other profiles by the conventional delay spread estimation methods. Due to larger multipath delay observed in the MBSFN fading, conventional methods may not work for detecting the MBSFN fading profile.

SUMMARY

A method and apparatus are disclosed that enable differentiation of the MBSFN fading profile from the non-MBSFN fading profiles which in turn may enable improved channel estimation and DL decoding.

In accordance with an aspect of the present disclosure, a method for detecting a fading profile at a client device in a wireless communication system may include controlling, by a processing device, estimating signal to noise ratio (SNR) of a reference signal (RS) of a Multicast Broadcast Single Frequency Network (MBSFN) based on a first Orthogonal Frequency Division Multiplexing (OFDM) symbol pair (x1, x2) and a second OFMD symbol pair (x1, x3), wherein the estimating determines a SNR1 for the first OFDM symbol pair and a SNR2 for the second OFDM symbol pair, and estimating, based on the SNR1 and the SNR2, the fading profile of a propagation channel to be a MBSFN fading profile or a non-MBSFN fading profile.

In one alternative, the method may include controlling, by the processing device, determining the SNR1, based on a signal power Ps determined by differential correlation (DC) of a pre-filtered MBSFN RS of OFDM symbol x1 with a corresponding MBSFN RS of OFDM symbol x2 and a total symbol power of the pre-filtered MBSFN RSs corresponding respectively to the first OFDM symbol pairs (x1, x2), and determining the SNR2, based on a signal power Ps determined by DC of the pre-filtered MBSFN RS of OFDM symbol x1 with a corresponding MBSFN RS of OFDM symbol x3 and a total symbol power determined of the pre-filtered MBSFN RSs corresponding respectively to the second OFDM symbol pair (x1, x3).

In one alternative, the first OFDM symbol pair may be OFMD symbol pair (2, 6) and wherein the second OFDM symbol pair may be OFMD symbol pair (2, 10).

In one alternative, the fading profile may be estimated based on a difference Delta_SNR=SNR2−SNR1.

In one alternative, a value of Delta_SNR for which the fading profile is estimated to be the MBSFN fading profile may be greater than a value of Delta_SNR for which the fading profile is estimated to be the non-MBSFN fading profile corresponding to a 3rd Generation Partnership Project (3GPP) Long Term Evolution (LTE) wireless communication system.

In one alternative, the method may include controlling, by the processing device, when the SNR2 is greater than or equal to a first threshold, setting a threshold T for SNR2 equal to a threshold T1, and when the SNR2 is not greater than or equal to the first threshold, setting the threshold T equal to a threshold T2; and wherein, when Delta_SNR is determined to be not greater than the threshold T, the fading profile is estimated to be the non-MBSFN fading profile, wherein, when Delta_SNR is determined to be greater than the threshold T and SNR1 is determined to be greater than or equal to a threshold S2, the fading profile is estimated to be the non-MBSFN fading profile, and wherein, when Delta_SNR is determined to be greater than the threshold T and SNR1 is determined to be less than the threshold S2, the fading profile is estimated to be the MBSFN fading profile.

In one alternative, the method may include controlling, by the processing device, when the estimated fading profile is the MBSFN fading profile, channel estimation by filtering of given MBSFN RSs according to the MBSFN fading profile.

In one alternative, the wireless communication system maybe a 3rd Generation Partnership Project (3GPP) Long Term Evolution (LTE) wireless communication system having 7.5 kHz or 15 kHz subcarrier spacing, wherein, for the 7.5 kHz subcarrier spacing, the first OFDM symbol pair is OFMD symbol pair (1, 3) and the second OFDM symbol pair is OFMD symbol pair (1, 5), and wherein, for the 15 kHz subcarrier spacing, the first OFDM symbol pair is OFMD symbol pair (2, 6) and the second OFDM symbol pair is OFMD symbol pair (2, 10).

In accordance with an aspect of the present disclosure, an apparatus for detecting a fading profile at a client device in a wireless communication system may include circuitry configured to control estimating signal to noise ratio (SNR) of a reference signal (RS) of a Multicast Broadcast Single Frequency Network (MBSFN) based on a first Orthogonal Frequency Division Multiplexing (OFDM) symbol pair (x1, x2) and a second OFMD symbol pair (x1, x3), wherein the estimating determines a SNR1 for the first OFDM symbol pair and a SNR2 for the second OFDM symbol pair, and estimating, based on the SNR1 and the SNR2, the fading profile of a propagation channel to be a MBSFN fading profile or a non-MBSFN fading profile.

In one alternative of the apparatus, the circuitry may be configured to control determining the SNR1, based on a signal power Ps determined by differential correlation (DC) of a pre-filtered MBSFN RS of OFDM symbol x1 with a corresponding MBSFN RS of OFDM symbol x2 and a total symbol power of the pre-filtered MBSFN RSs corresponding respectively to the first OFDM symbol pairs (x1, x2), and determining the SNR2, based on a signal power Ps determined by DC of the pre-filtered MBSFN RS of OFDM symbol x1 with a corresponding MBSFN RS of OFDM symbol x3 and a total symbol power determined of the pre-filtered MBSFN RSs corresponding respectively to the second OFDM symbol pair (x1, x3).

In one alternative of the apparatus, the first OFDM symbol pair may be OFMD symbol pair (2, 6) and the second OFDM symbol pair may be OFMD symbol pair (2, 10).

In one alternative of the apparatus, the fading profile may be estimated based on a difference Delta_SNR=SNR2−SNR1.

In one alternative of the apparatus, a value of Delta_SNR for which the fading profile is estimated to be the MBSFN fading profile may be greater than a value of Delta_SNR for which the fading profile is estimated to be the non-MBSFN fading profile corresponding to a 3rd Generation Partnership Project (3GPP) Long Term Evolution (LTE) wireless communication system.

In one alternative of the apparatus, the circuitry may be configured to control when the SNR2 is greater than or equal to a first threshold, setting a threshold T for SNR2 equal to a threshold T1, and when the SNR2 is not greater than or equal to the first threshold, setting the threshold T equal to a threshold T2; and wherein, when Delta_SNR is determined to be not greater than the threshold T, the fading profile is estimated to be the non-MBSFN fading profile, wherein, when Delta_SNR is determined to be greater than the threshold T and SNR1 is determined to be greater than or equal to a threshold S2, the fading profile is estimated to be the non-MBSFN fading profile, and wherein, when Delta_SNR is determined to be greater than the threshold T and SNR1 is determined to be less than the threshold S2, the fading profile is estimated to be the MBSFN fading profile.

In one alternative of the apparatus, the circuitry may be configured to control, when the estimated fading profile is the MBSFN fading profile, channel estimation by filtering of given MBSFN RSs according to the MBSFN fading profile.

In one alternative of the apparatus, the wireless communication system may be a 3rd Generation Partnership Project (3GPP) Long Term Evolution (LTE) wireless communication system having 7.5 kHz or 15 kHz subcarrier spacing, wherein, for the 7.5 kHz subcarrier spacing, the first OFDM symbol pair is OFMD symbol pair (1, 3) and the second OFDM symbol pair is OFMD symbol pair (1, 5), and wherein, for the 15 kHz subcarrier spacing, the first OFDM symbol pair is OFMD symbol pair (2, 6) and the second OFDM symbol pair is OFMD symbol pair (2, 10).

In accordance with an aspect of the present disclosure, a wireless communication device may include a receiver to receive a signal of a wireless communication system; and a processing device configured to control detecting a fading profile at the wireless communication device. The processing device may be configured to control estimating signal to noise ratio (SNR) of a reference signal (RS) of a Multicast Broadcast Single Frequency Network (MBSFN) based on a first Orthogonal Frequency Division Multiplexing (OFDM) symbol pair (x1, x2) and a second OFMD symbol pair (x1, x3), wherein the estimating determines a SNR1 for the first OFDM symbol pair and a SNR2 for the second OFDM symbol pair, and estimating, based on the SNR1 and the SNR2, the fading profile of a propagation channel to be a MBSFN fading profile or a non-MBSFN fading profile.

In one alternative of the wireless communication device, the processing device may be configured to control determining the SNR1, based on a signal power Ps determined by differential correlation (DC) of a pre-filtered MBSFN RS of OFDM symbol x1 with a corresponding MBSFN RS of OFDM symbol x2 and a total symbol power of the pre-filtered MBSFN RSs corresponding respectively to the first OFDM symbol pairs (x1, x2), and determining the SNR2, based on a signal power Ps determined by DC of the pre-filtered MBSFN RS of OFDM symbol x1 with a corresponding MBSFN RS of OFDM symbol x3 and a total symbol power determined of the pre-filtered MBSFN RSs corresponding respectively to the second OFDM symbol pair (x1, x3).

In one alternative of the wireless communication device, the fading profile may be estimated based on a difference Delta_SNR=SNR2−SNR1.

In one alternative of the wireless communication device, the processing device may be configured to control, when the estimated fading profile is the MBSFN fading profile, channel estimation by filtering of given MBSFN RSs according to the MBSFN fading profile.

BRIEF DESCRIPTION OF THE DRAWINGS

FIG. 2 illustrates FDD, TDD and H-FDD duplexing techniques.

FIG. 7 illustrates the propagation conditions for multi path fading environments for verifying PMCH performance requirements in an extended delay spread environment.

FIG. 12 illustrates the channel parameters for MBSFN fading profile with 5 Hz Doppler frequency.

FIG. 16 illustrates the comparison of the mean of the SNR computed from the MBSFN RS based SNR estimation from the RS OFDM symbols pairs (2, 6) and (2, 10) according to the aspects of the present disclosure.

FIG. 17 illustrates the comparison of the fluctuations of the SNR computed from the MBSFN RS based SNR estimation from the RS OFDM symbols pairs (2, 6) and (2, 10) according to the aspects of the present disclosure.

FIG. 18 illustrates the percentage of detection of MBSFN and non-MBSFN fades for the standard fading profiles according to the aspects of the present disclosure.

DETAILED DESCRIPTION

Figure 1:
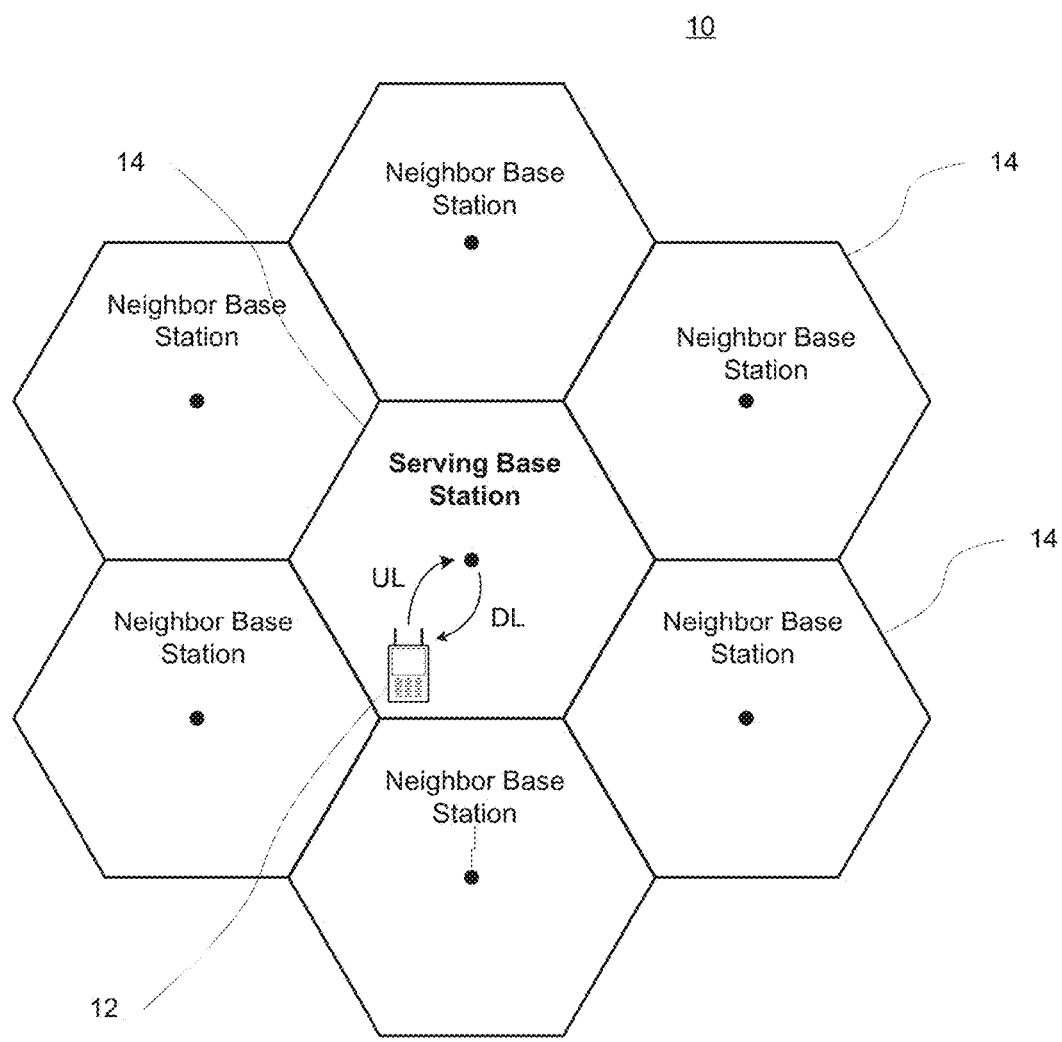
FIG. 1 illustrates a conventional wireless cellular communication system.
Figure 3:
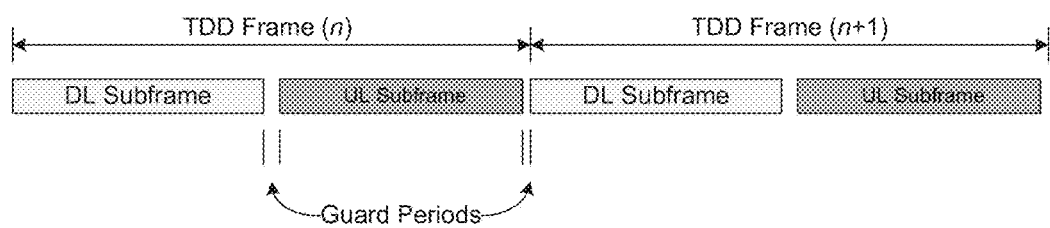
FIG. 3 illustrates a TDD frame consisting of DL portions and UL portions.
Figure 4:
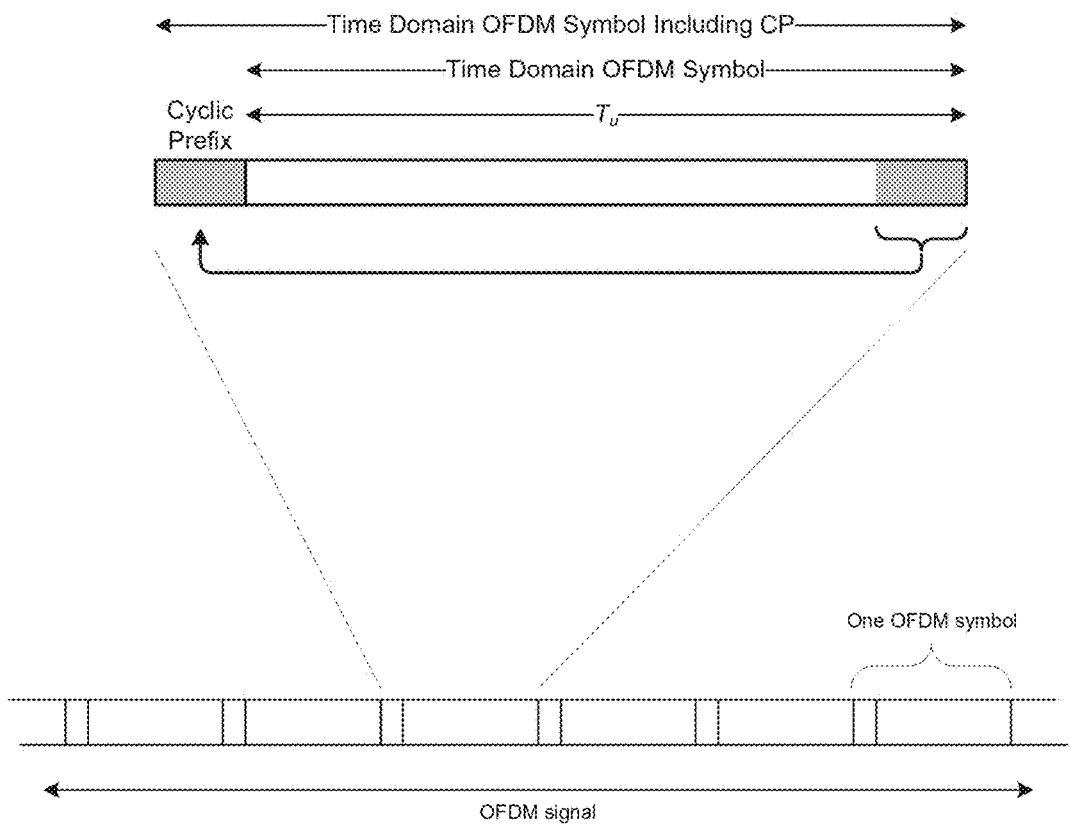
FIG. 4 illustrates an OFDM symbol with Cyclic Prefix Insertion.
Figure 5:
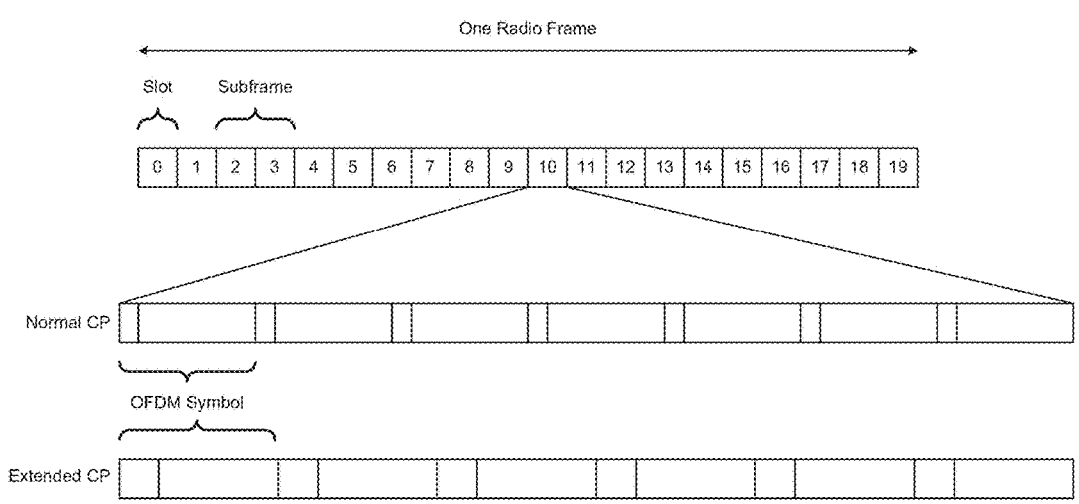
FIG. 5 illustrates the frame structure of the air interface of the 3GPP LTE wireless communication system.
Figure 6:
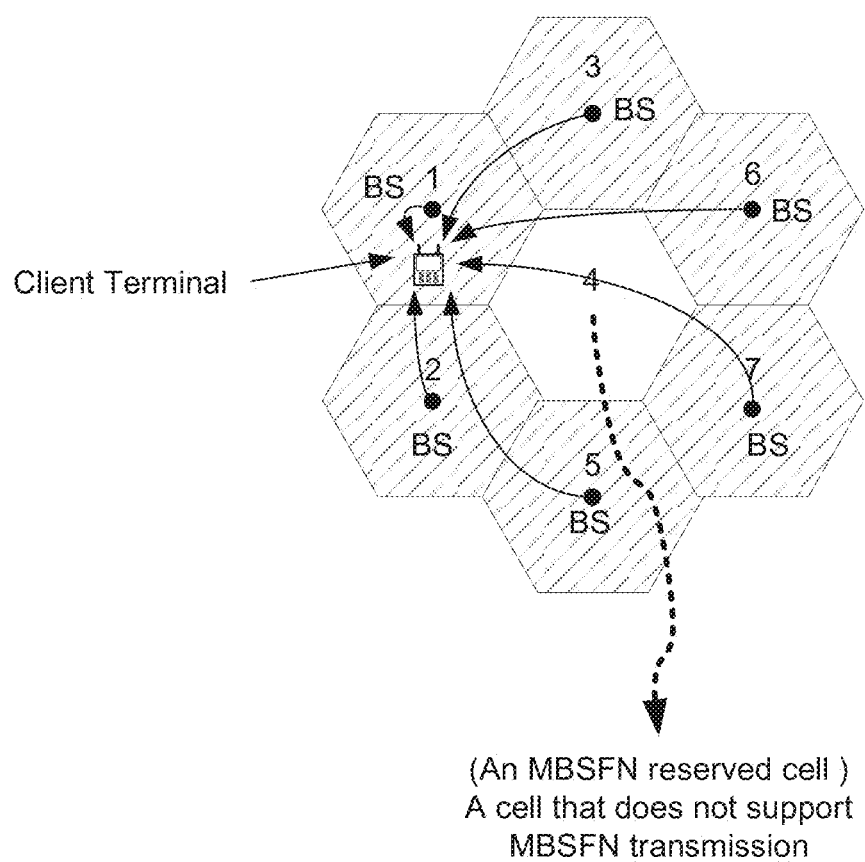
FIG. 6 illustrates an example eMBMS transmission using multiple cells.
Figure 8:
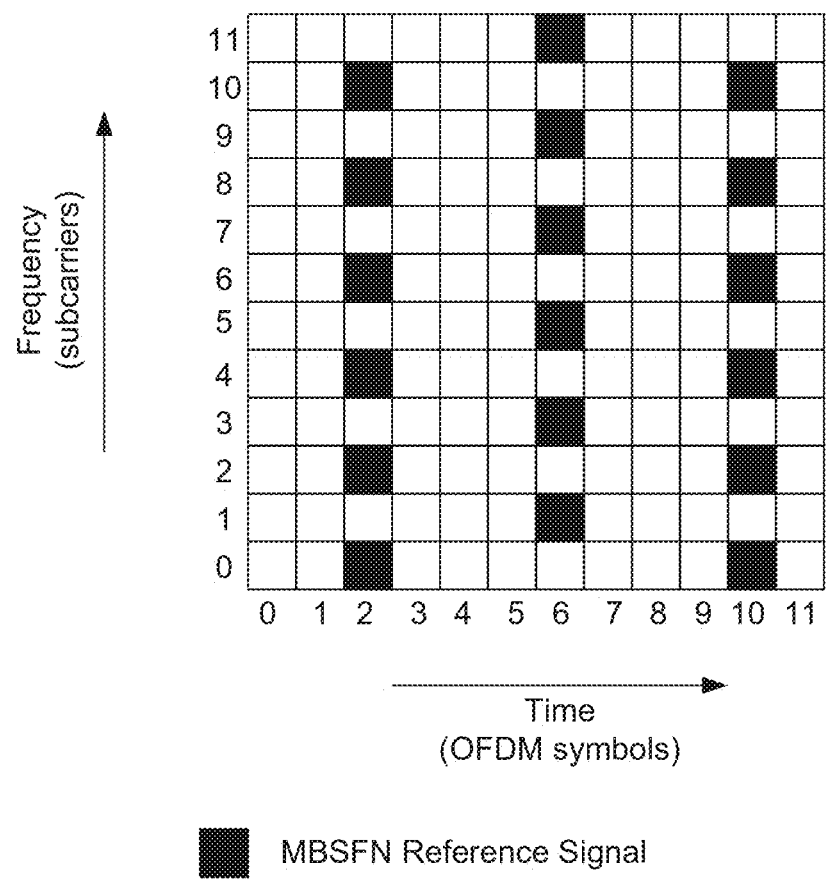
FIG. 8 illustrates the MBSFN RS positions for 15 kHz subcarrier spacing.
Figure 9:
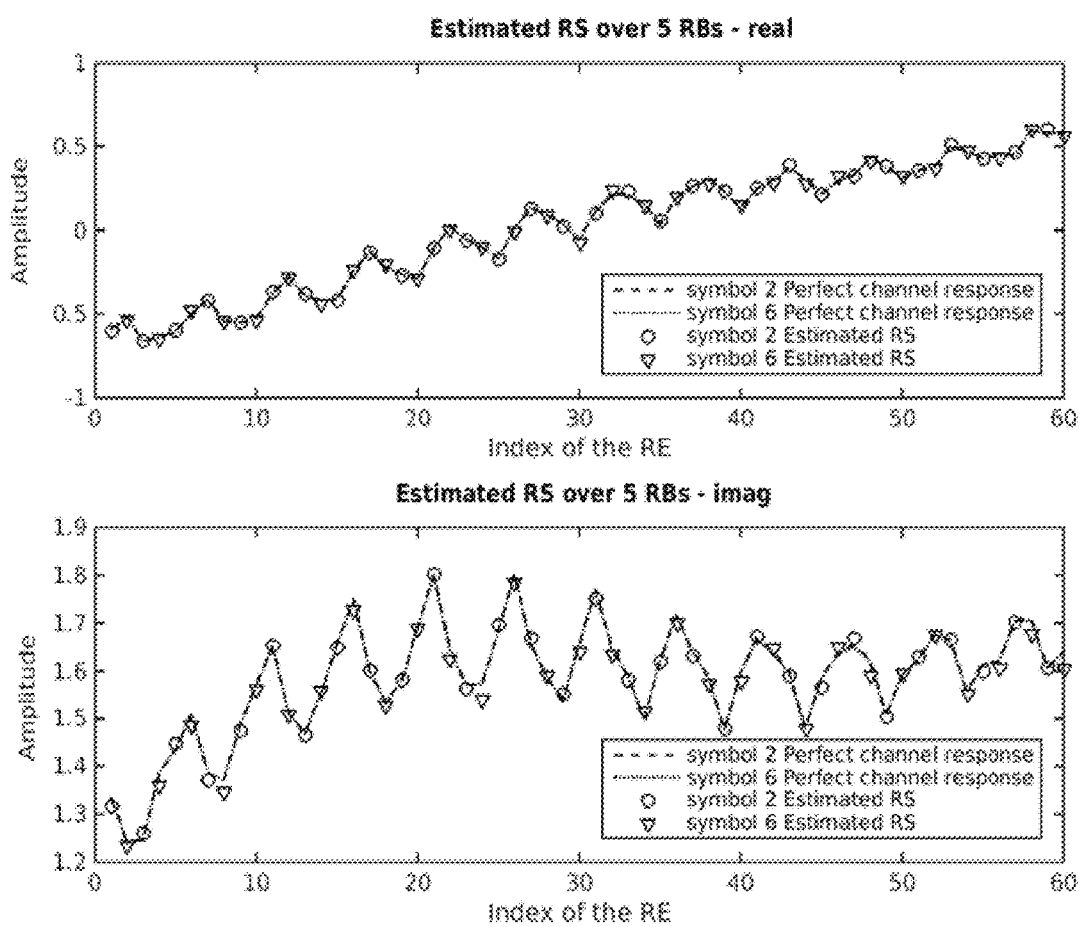
FIG. 9 illustrates an example of received MBSFN RS of OFDM symbols pair (2, 6) for 15 kHz subcarrier spacing.
Figure 10:
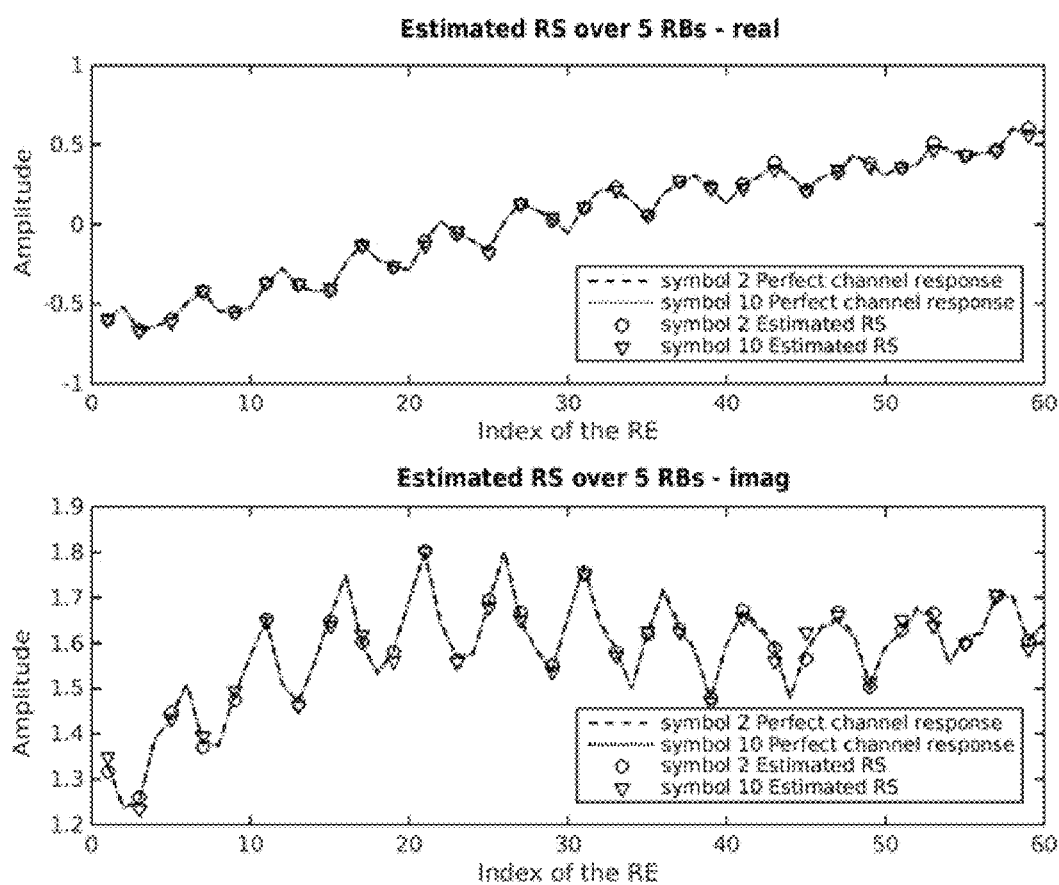
FIG. 10 illustrates an example of received MBSFN RS of OFDM symbols pair (2, 10) for 15 kHz subcarrier spacing.
Figure 11:
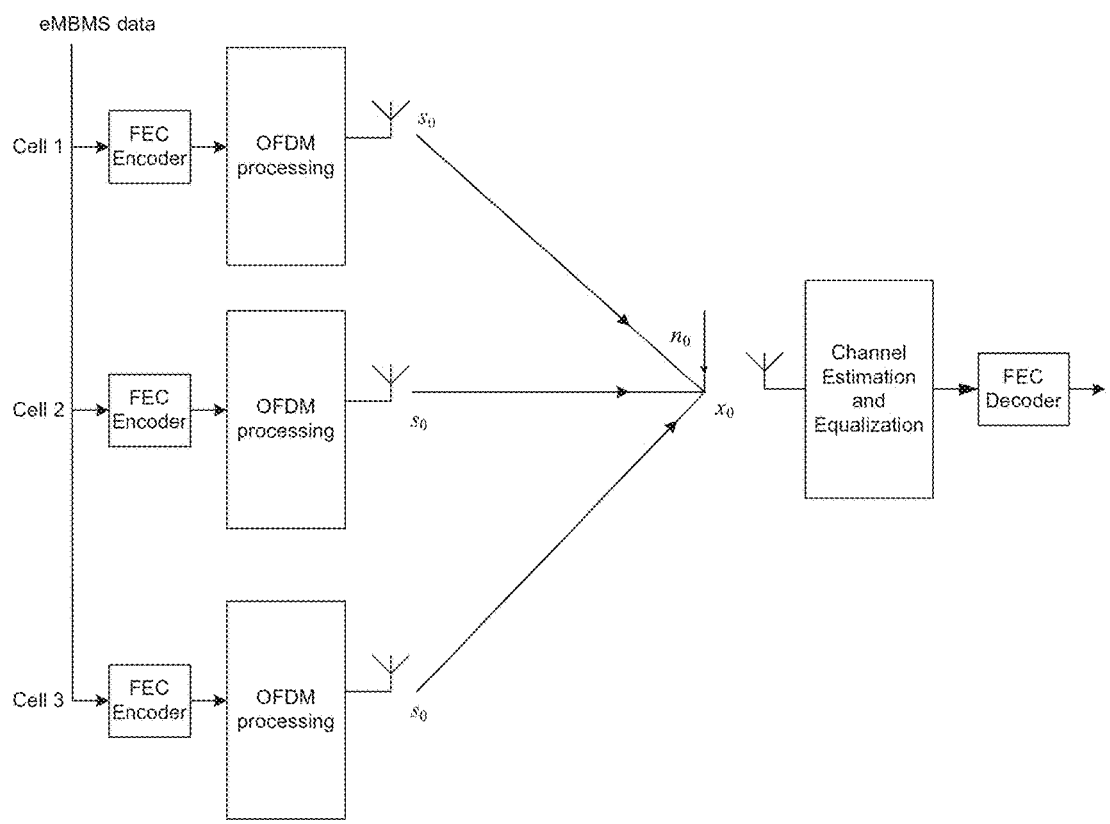
FIG. 11 illustrates an example wireless communication system with MBSFN transmission from three cells.

The foregoing aspects, features and advantages of the present disclosure will be further appreciated when considered with reference to the following description of preferred embodiments and accompanying drawings, wherein like reference numerals represent like elements. In describing the preferred embodiments of the disclosure illustrated in the appended drawings, specific terminology will be used for the sake of clarity. However, the disclosure is not intended to be limited to the specific terms used.

According to an aspect of the present disclosure, when a client terminal is unaware of the fading involved in a propagation channel, it performs MBSFN RS based SNR estimation using two different pairs of OFDM symbols followed by fading profile estimation to differentiate between the MBSFN fading profile and any non-MBSFN fading profile. For MBSFN fading the coherence time is observed to be about 31 ms and 2.2 ms for 5 Hz and 70 Hz respectively. The coherence time is long enough that the RS OFDM symbols pair (2, 6) and pair (2, 10) may be used in the MBSFN RS based SNR estimation.

Figure 13:
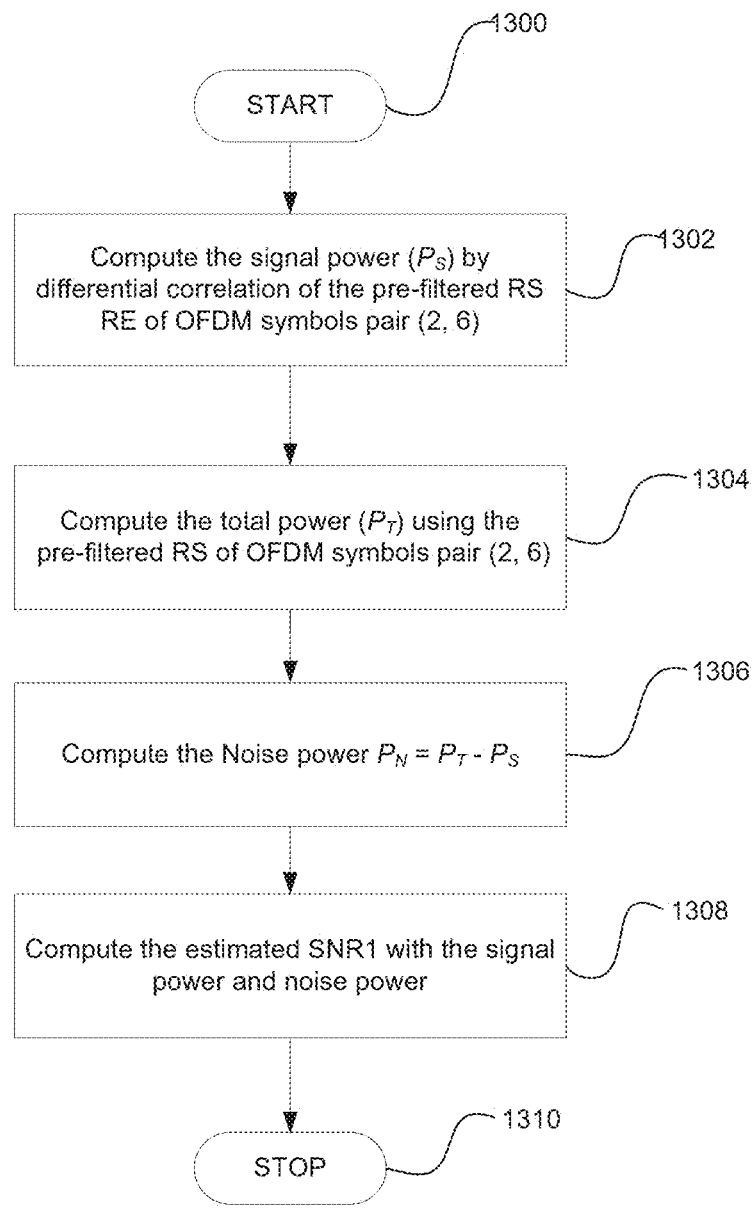
FIG. 13 illustrates the flow chart for MBSFN RS based Signal to Noise Ratio (SNR) estimation using the OFDM symbols pair (2, 6) according to the aspects of the present disclosure.

The flow diagram contained in FIG. 13 illustrates the MBSFN RS based SNR estimation for RS OFDM symbols pair (2, 6) according to the aspects of the present disclosure. The processing relevant to the present disclosure begins at processing stage 1302, where the signal power may be estimated by the differential correlation (DC) of pre-filtered MBSFN RS of OFDM symbol 2 with the corresponding MBSFN RS of OFDM symbol 6. The RS REs used from OFDM symbols pair (2, 6) are separated by one RE in the frequency domain and four OFDM symbols in the time domain. The differential correlation may be performed between the RS REs of OFDM symbols pair (2, 6) over the entire bandwidth. The differential correlation of $n^{th}$ pre-filtered MBSFN RS RE of OFDM symbol 2 and $n^{th}$ pre filtered MBSFN RS RE of OFDM symbol 6 in the extracted RS REs extracted from the respective OFDM symbols is defined as $$DC_n = RS_{6,n}^* * RS_{2,n},$$

where, $RS_{i,n}$: Pre-filtered RS of the $n^{th}$ RS RE and $i^{th}$ OFDM symbol n: 0 to [(number of downlink RBs×number of RS in one RB)−1]

The size of the extracted RS REs is equal to the number of downlink RBs for a particular channel bandwidth multiplied by the number of RS REs in each RB per OFDM symbol. The accumulated and averaged differential correlation value is defined as follows:

$$DC = \frac{1}{6*N_{RB}^{DL}} \sum_{n=0}^{(6*N_{RB}^{DL})-1} DC_n$$

The signal power may be estimated from the averaged differential correlation value as $$P_S = \sqrt{(DC \cdot re * DC \cdot re) + (DC \cdot im * DC \cdot im)}$$

where, $DC_n$: Differential correlation output $P_S$: Signal power

At processing stage 1304, the total symbol power may be obtained using pre-filtered MBSFN RS corresponding to ODFM symbols pair (2, 6). Non-coherent combining of the power terms using the RS across the entire bandwidth may be performed to obtain total RS power of OFDM symbol 2. The same procedure is repeated for OFDM symbol 6. Total power may be obtained as the product of square root of averaged power of OFDM symbol 2 and OFDM symbol 6.

$$P_T = sqrt\left(\frac{1}{6*N_{RB}^{DL}} \sum_{n=0}^{(6*N_{RB}^{DL})-1} PW_{2,n}\right) * sqrt\left(\frac{1}{6*N_{RB}^{DL}} \sum_{n=0}^{(6*N_{RB}^{DL})-1} PW_{6,n}\right)$$

where, $PW_{i,n} = RS_{i,n}^* * RS_{i,n}$ $P_T$: Total power

At processing stage 1306, noise power is estimated using RS signal power from processing stage 1302 and total RS power from processing stage 1304 as $$P_N = P_T - P_S$$

where, $P_N$: Noise power

At processing stage 1308, linear to logarithmic conversion of the signal power and noise power is performed and the SNR1 is estimated as follows:

$$(SNR1)_{dB} = (10 \times \log_{10} P_S) - (10 \times \log_{10} P_N)$$

The processing flow for SNR1 computation suitably terminates at stage 1310.

Figure 14:
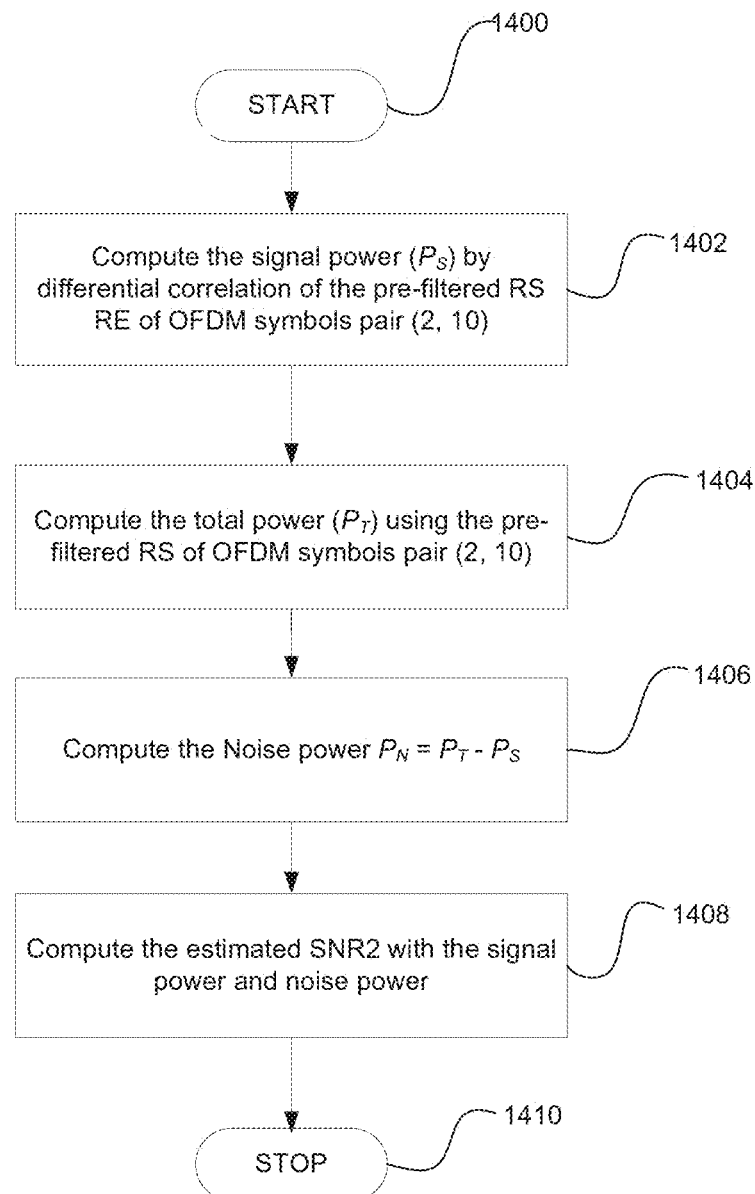
FIG. 14 illustrates the flow chart for MBSFN RS based SNR estimation using the OFDM symbols pair (2, 10) according to the aspects of the present disclosure.

The SNR1 estimated from the above processing steps may be used for delay spread estimation. The flow diagram contained in FIG. 14 illustrates the MBSFN RS based SNR2 estimation using RS OFDM symbols pair (2, 10) according to the aspects of the present disclosure. The processing stages of FIG. 14 are the same as FIG. 13 except for the particular RS OFDM symbols used.

Figure 15:
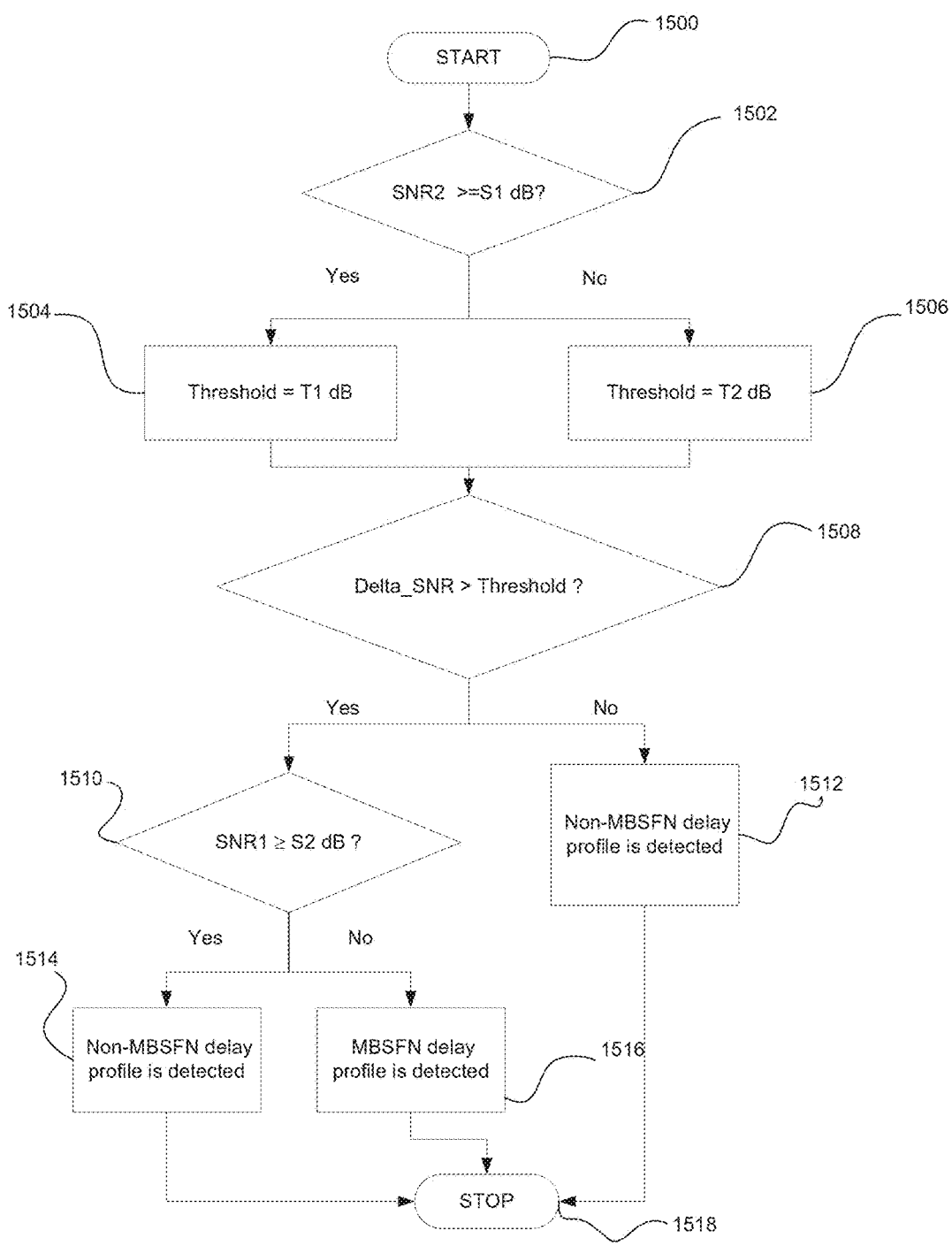
FIG. 15 illustrates the flow chart for MBSFN RS based delay spread estimation using the estimated SNR from RS OFDM symbols pairs (2, 6) and (2, 10) according to the aspects of the present disclosure.

The flow diagram contained in FIG. 15 illustrates the MBSFN RS based delay spread estimation using estimated SNR1 and SNR2 for different OFDM symbols pairs according to the aspects of the present disclosure. In case of MBSFN fading profile, the SNR1 estimated using the OFDM symbols pair (2, 6) may be limited, i.e., less than the prevailing SNR, due to higher frequency selective fading over the RS RE pairs used for differential correlation. The SNR2 estimated using OFDM symbols pair (2, 10) may be closer to the true SNR as the RS RE pairs used for differential correlation may have identical or similar fading due to the use of the same subcarrier and due to the long coherence time. Let the difference between the two SNRs be denoted by Delta_SNR, i.e., Delta_SNR=SNR2−SNR1. According to an aspect of the present disclosure, Delta_SNR may be larger for MBSFN fading profile than for other standard 3GPP LTE wireless communication system propagation fading profiles. The method in the present disclosure, computes the Delta_SNR to map the fading profile to either MBSFN fading profile or non-MBSFN fading profile. However the mapping of Delta_SNR to MBSFN fading profile or non-MBSFN fading profile varies as a function of prevailing SNR. In order to reliably detect the MBSFN delay profile over wide SNR range, a threshold S1 is used to select between two different thresholds T1 and T2 for comparison with Delta_SNR. At processing stage 1502, the SNR2, i.e., the estimate of prevailing SNR, is compared with a threshold S1. At processing stage 1504, the threshold T is assigned as T1 if SNR2 is greater than or equal to S1. At processing stage 1506, the threshold T is assigned as T2 if SNR2 is less than S1, where T1 is greater than T2. With the threshold T from the last two stages, the processing stage 1508 compares the Delta_SNR with the threshold T. At processing stage 1512, a non-MBSFN fading profile may be detected if the Delta_SNR is less than or equal to the threshold T. At processing stage 1510, the SNR1 is compared with the threshold S2 if the Delta_SNR is greater than the threshold T. At processing stage 1514, a non-MBSFN fading profile is detected if SNR1 is greater than or equal to S2. At processing stage 1516, the MBSFN fading profile is detected. With the detected MBSFN fading profile, the client terminal may perform channel estimation using filtering of MBSFN RS targeted for such fading profiles. When a non-MBSFN fading profile is detected at processing stages 1512 or 1514, conventional methods may be used to further differentiate fading profiles such as the Extended Pedestrian A (EPA), Extended Vehicular A (EPA), and Extended Typical Urban (ETU) in conjunction with different example Doppler frequencies such as 5 Hz, 70 Hz, and 300 Hz.

The mean and fluctuations of the SNR obtained from the MBSFN RS based SNR estimation for 10 MHz channel bandwidth are tabulated in FIG. 16 and FIG. 17 respectively for different fading profiles. The example fading profiles used for analysis include the EPA, EVA, ETU, and MBSFN in conjunction with different example Doppler frequencies such as 5 Hz, 70 Hz, and 300 Hz. The measure of fluctuations is obtained from the difference of the SNR from the $5^{th}$ and $95^{th}$ percentile of the estimated SNRs. According to an aspect of the present disclosure, the threshold values may be configurable and may be obtained based on the differences observed in the mean and fluctuation between the fading profiles.

The table contained in FIG. 18 illustrates the percentage of detection of MBSFN and non-MBSFN fading profiles according to the aspect of the present disclosure. As can be observed from FIG. 18, the disclosed method works well for over wide range of SNR and fading conditions.

Figure 19:
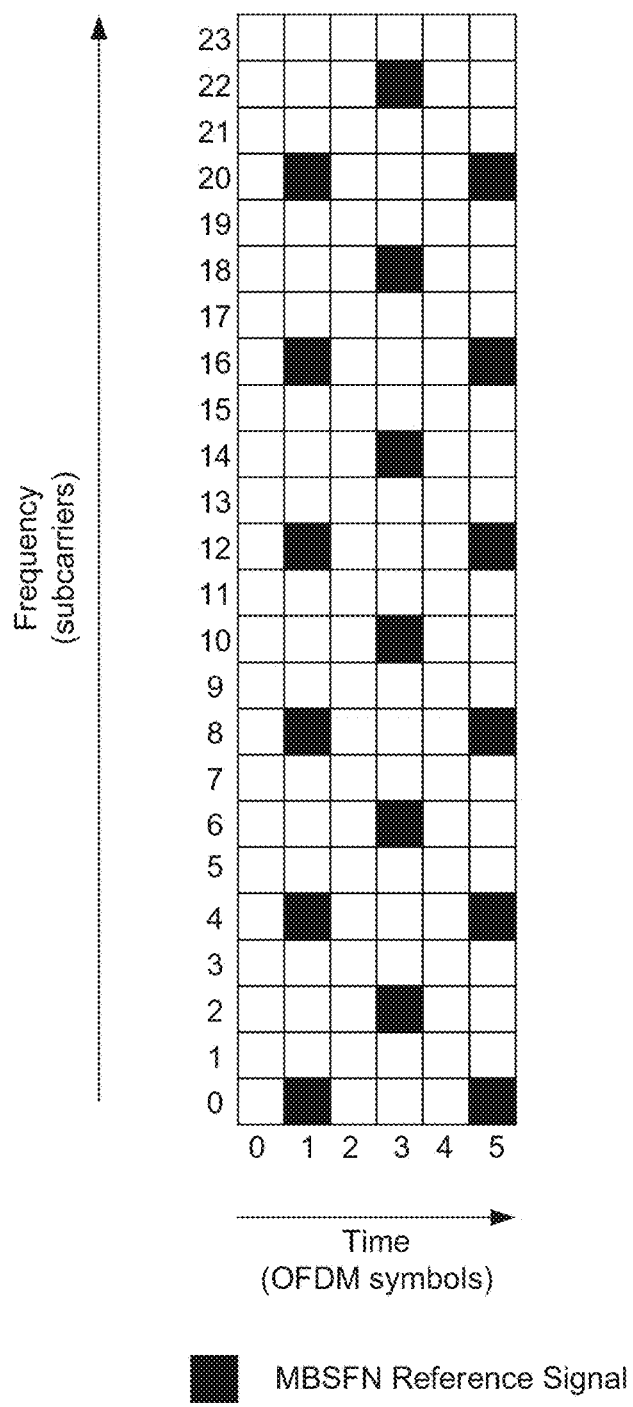
FIG. 19 illustrates the MBSFN RS positions for 7.5 kHz subcarrier spacing.

According to an aspect of the present disclosure, the MBSFN delay profile detection may be applicable to a 3GPP LTE wireless communication system with either 15 kHz or 7.5 kHz subcarrier spacing. The location of the MBSFN RS REs for 7.5 kHz subcarrier spacing is illustrated in FIG. 19. The processing flows for 15 kHz and 7.5 kHz frequency spacing are similar except that the number of available RS REs is different for 15 kHz and 7.5 kHz frequency spacing and the OFDM symbol numbers to be used may be adapted accordingly. For example, instead of OFDM symbols pairs (2, 6) and (2, 10) used for 15 kHz subcarrier spacing, the OFDM symbols pairs (1, 3) and (1, 5) may be used for 7.5 kHz subcarrier spacing.

Figure 20:
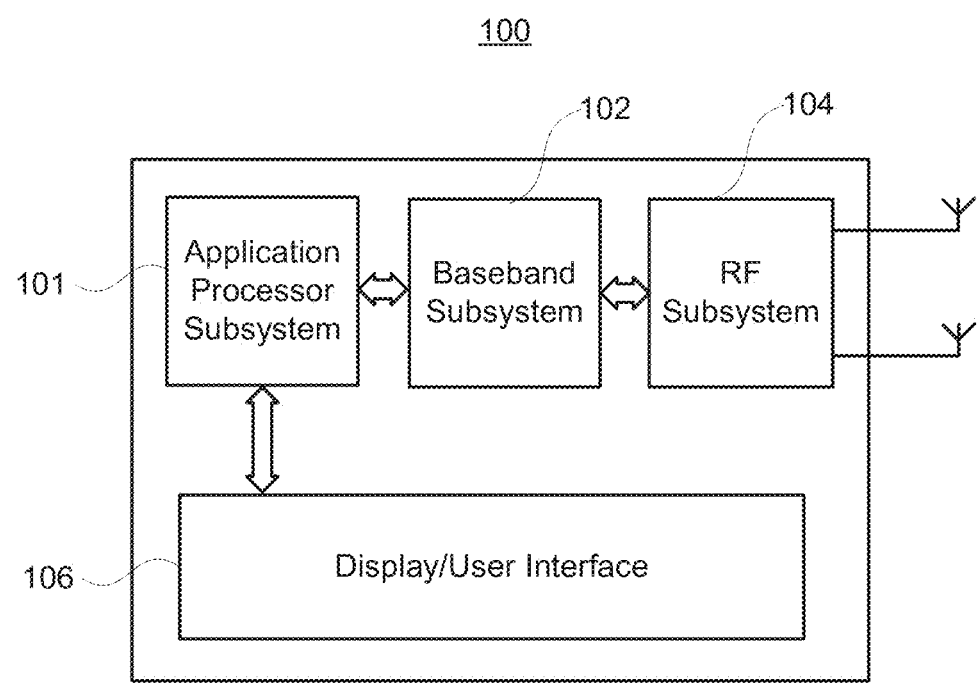
FIG. 20 illustrates a wireless mobile station diagram, which may be employed with aspects of the disclosure described herein.

By way of example only, the above-described method may be implemented in a receiver, e.g., a user device such as a wireless mobile station (MS) 100 as shown in FIG. 20.

As shown in FIG. 20, MS 100 may include an application processor subsystem 101, baseband subsystem 102 and a radio frequency (RF) subsystem 104 for use with a wireless communication network. A display/user interface 106 provides information to and receives input from the user. By way of example, the user interface may include one or more actuators, a speaker and a microphone. In some mobile devices, certain combination of the application processor subsystem 101, the baseband subsystem 102 and the RF subsystem 104 are all integrated as one integrated chip.

Figure 21:
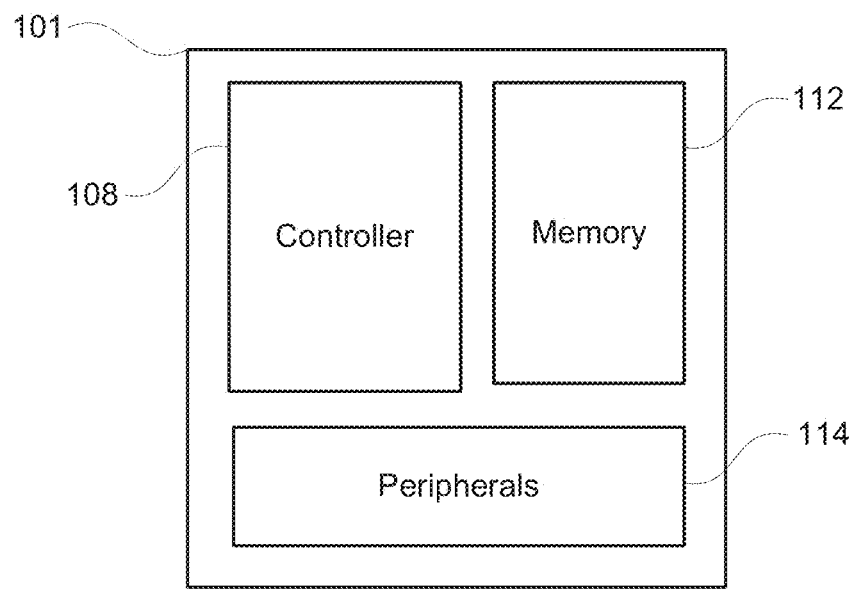
FIG. 21 illustrates an application processor subsystem for a wireless mobile station, which may be employed with aspects of the disclosure described herein.
Figure 22:
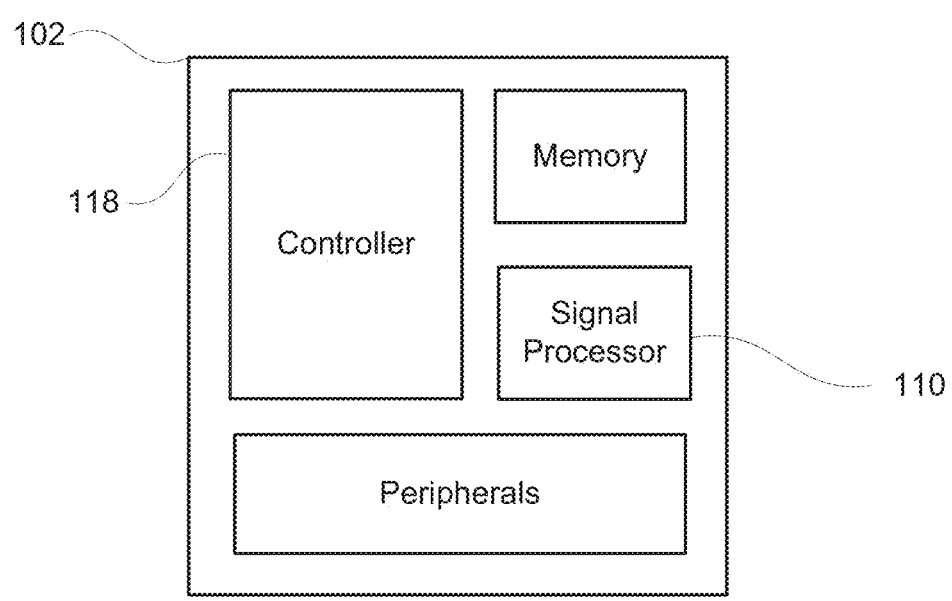
FIG. 22 illustrates a baseband subsystem for a wireless mobile station, which may be employed with aspects of the disclosure described herein.
Figure 23:
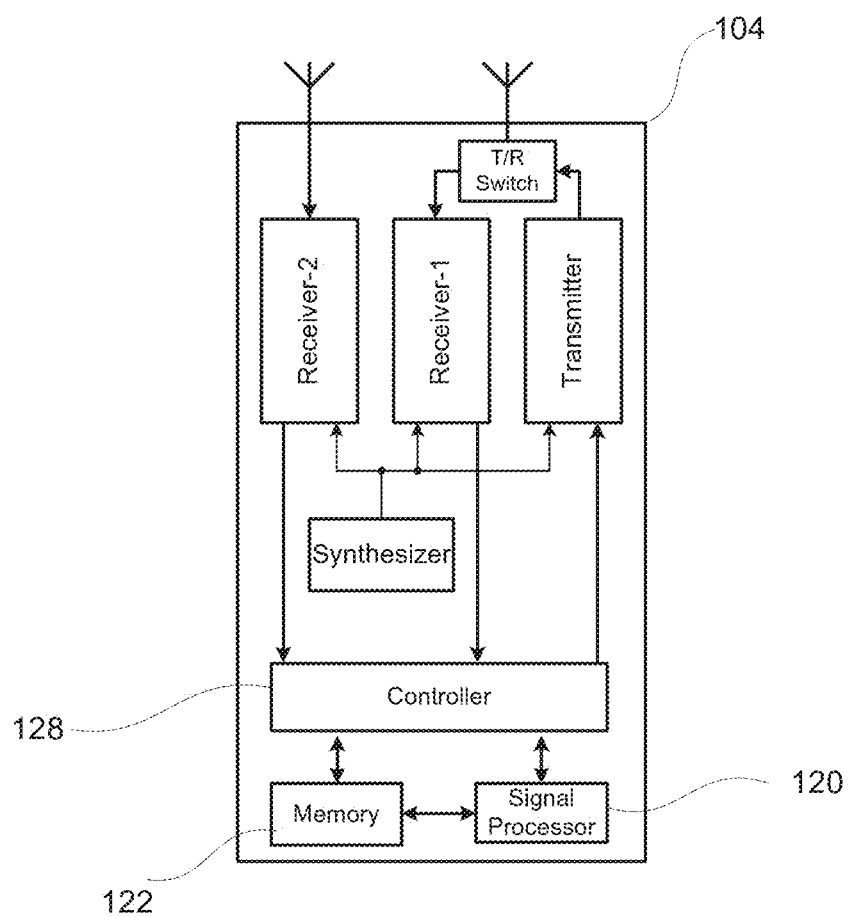
FIG. 23 illustrates a Radio Frequency (RF) subsystem for a wireless mobile station, which may be employed with aspects of the disclosure described herein.

The application processor subsystem 101 as shown in FIG. 21 may include a controller 108 such as a microcontroller, another processor or other circuitry. The baseband subsystem 102 as shown in FIG. 22 may include a controller 118 such as a microcontroller or other processor. The RF subsystem 104 as shown in FIG. 23 may include a controller 128 such as a microcontroller, another processor or other circuitry. The controller 108 desirably handles overall operation of the MS 100. This may be done by any combination of hardware, software and firmware running on the controller 108. Such a combination of hardware, software and firmware may embody any methods in accordance with aspects of the present disclosure.

Peripherals 114 such as a full or partial keyboard, video or still image display, audio interface, etc may be employed and managed through the controller 108.

Aspects of the present disclosure may be implemented in firmware of the controller 108 of the application processor and/or the controller 118 of the baseband subsystem. In another alternative, aspects of the present disclosure may also be implemented as a combination of firmware and hardware of the application processor subsystem 101 and/or the baseband subsystem 102. For instance, a signal processing entity of any or all of the FIG. 22 may be implemented in firmware, hardware and/or software. It may be part of the baseband subsystem, the receiver subsystem or be associated with both subsystems. In one example, the controller 118 and/or the signal processor 150 may include or control the protocol entity circuitry. The software may reside in internal or external memory and any data may be stored in such memory. The hardware may be an application specific integrated circuit (ASIC), field programmable gate array (FPGA), discrete logic components or any combination of such devices. The terms controller and processor are used interchangeably herein.

The consumer electronics devices that may use this disclosure may include smartphones, tablets, laptops, gaming consoles, cameras, video camcorders, TV, car entertainment systems, etc.

Although the disclosure herein has been described with reference to particular embodiments, it is to be understood that these embodiments are merely illustrative of the principles and applications of the present disclosure. It is therefore to be understood that numerous modifications may be made to the illustrative embodiments and that other arrangements may be devised without departing from the spirit and scope of the present disclosure as defined by the appended claims. Aspects of each embodiment may be employed in the other embodiments described herein.

The invention claimed is:

1. A method for detecting a fading profile at a client device in a wireless communication system, the method comprising:
controlling, by a processing device,
estimating signal to noise ratio (SNR) of a reference signal (RS) of a Multicast Broadcast Single Frequency Network (MBSFN) based on a first Orthogonal Frequency Division Multiplexing (OFDM) symbol pair of OFDM symbol x1 and OFDM symbol x2 and a second OFMD symbol pair of the OFDM symbol x1 and OFDM symbol x3, wherein the estimating determines a SNR1 for the first OFDM symbol pair and a SNR2 for the second OFDM symbol pair, and
estimating, based on the SNR1 and the SNR2, the fading profile of a propagation channel to be a MBSFN fading profile or a non-MBSFN fading profile,
wherein the fading profile is estimated based on a difference Delta_SNR=SNR2−SNR1, and
wherein a value of Delta_SNR for which the fading profile is estimated to be the MBSFN fading profile is greater than a value of Delta_SNR for which the fading profile is estimated to be the non-MBSFN fading profile corresponding to a predetermined wireless communication system.

2. The method of claim 1, further comprising:
controlling, by the processing device,
determining the SNR1, based on a signal power Ps determined by differential correlation (DC) of a pre-filtered MBSFN RS of the OFDM symbol x1 with a corresponding MBSFN RS of the OFDM symbol x2 and a total symbol power of the pre-filtered MBSFN RSs corresponding respectively to the first OFDM symbol pair, and
determining the SNR2, based on a signal power Ps determined by DC of the pre-filtered MBSFN RS of the OFDM symbol x1 with a corresponding MBSFN RS of the OFDM symbol x3 and a total symbol power of the pre-filtered MBSFN RSs corresponding respectively to the second OFDM symbol pair.

3. The method of claim 2, wherein the OFMD symbol x1 is OFDM symbol 2, the OFDM symbol x2 is OFDM symbol 6 and the OFDM symbol x3 is OFDM symbol 10.

4. The method of claim 1, wherein the predetermined wireless communication system is a 3rd Generation Partnership Project (3GPP) Long Term Evolution (LTE) wireless communication system.

5. The method of claim 1, further comprising:
controlling, by the processing device,
when the SNR2 is greater than or equal to a first threshold, setting a threshold T for SNR2 equal to a threshold T1, and
when the SNR2 is not greater than or equal to the first threshold, setting the threshold T equal to a threshold T2; and
wherein, when Delta_SNR is determined to be not greater than the threshold T, the fading profile is estimated to be the non-MBSFN fading profile,
wherein, when Delta_SNR is determined to be greater than the threshold T and SNR1 is determined to be greater than or equal to a threshold S2, the fading profile is estimated to be the non-MBSFN fading profile, and
wherein, when Delta_SNR is determined to be greater than the threshold T and SNR1 is determined to be less than the threshold S2, the fading profile is estimated to be the MBSFN fading profile.

6. The method of claim 1, further comprising:
controlling, by the processing device, when the estimated fading profile is the MBSFN fading profile, channel estimation by filtering of given MBSFN RSs according to the MBSFN fading profile.

7. The method of claim 1,
wherein the predetermined wireless communication system is a 3rd Generation Partnership Project (3GPP) Long Term Evolution (LTE) wireless communication system having 7.5 kHz or 15 kHz subcarrier spacing,
wherein, for the 7.5 kHz subcarrier spacing, the OFDM symbol x1 is OFDM symbol 1, the OFDM symbol x2 is OFDM symbol 3 and the OFDM symbol x3 is OFDM symbol 5, and
wherein, for the 15 kHz subcarrier spacing, the first OFDM symbol x1 is OFDM symbol 2, the OFDM symbol x2 is OFDM symbol 6 and the OFDM symbol x3 is OFDM symbol 10.

8. An apparatus for detecting a fading profile at a client device in a wireless communication system, the apparatus comprising:
circuitry configured to control
estimating signal to noise ratio (SNR) of a reference signal (RS) of a Multicast Broadcast Single Frequency Network (MBSFN) based on a first Orthogonal Frequency Division Multiplexing (OFDM) symbol pair of OFDM symbol x1 and OFDM symbol x2 and a second OFMD symbol pair of the OFDM symbol x1 and OFDM symbol x3, wherein the estimating determines a SNR1 for the first OFDM symbol pair and a SNR2 for the second OFDM symbol pair, and
estimating, based on the SNR1 and the SNR2, the fading profile of a propagation channel to be a MBSFN fading profile or a non-MBSFN fading profile,
wherein the fading profile is estimated based on a difference Delta_SNR=SNR2−SNR1, and
wherein a value of Delta_SNR for which the fading profile is estimated to be the MBSFN fading profile is greater than a value of Delta_SNR for which the fading profile is estimated to be the non-MBSFN fading profile corresponding to a predetermined wireless communication system.

9. The apparatus of claim 8,
wherein the circuitry is configured to control
determining the SNR1 based on a signal power Ps determined by differential correlation (DC) of a pre-filtered MBSFN RS of the OFDM symbol x1 with a corresponding MBSFN RS of the OFDM symbol x2 and a total symbol power of the pre-filtered MBSFN RSs corresponding respectively to the first OFDM symbol pair, and
determining the SNR2, based on a signal power Ps determined by DC of the pre-filtered MBSFN RS of the OFDM symbol x1 with a corresponding MBSFN RS of the OFDM symbol x3 and a total symbol power of the pre-filtered MBSFN RSs corresponding respectively to the second OFDM symbol pair.

10. The apparatus of claim 9, wherein the first OFDM symbol x1 is OFDM symbol 2, the OFDM symbol x2 is OFDM symbol 6 and the OFDM symbol x3 is OFDM symbol 10.

11. The apparatus of claim 8, wherein the predetermined wireless communication system is a 3rd Generation Partnership Project (3GPP) Long Term Evolution (LTE) wireless communication system.

12. The apparatus of claim 8,
wherein the circuitry is configured to control
when the SNR2 is greater than or equal to a first threshold, setting a threshold T for SNR2 equal to a threshold T1, and
when the SNR2 is not greater than or equal to the first threshold, setting the threshold T equal to a threshold T2; and
wherein, when Delta_SNR is determined to be not greater than the threshold T, the fading profile is estimated to be the non-MBSFN fading profile,
wherein, when Delta_SNR is determined to be greater than the threshold T and SNR1 is determined to be greater than or equal to a threshold S2, the fading profile is estimated to be the non-MBSFN fading profile, and
wherein, when Delta_SNR is determined to be greater than the threshold T and SNR1 is determined to be less than the threshold S2, the fading profile is estimated to be the MBSFN fading profile.

13. The apparatus of claim 8,
wherein the circuitry is configured to control, when the estimated fading profile is the MBSFN fading profile, channel estimation by filtering of given MBSFN RS s according to the MBSFN fading profile.

14. The apparatus of claim 8,
wherein the predetermined wireless communication system is a 3rd Generation Partnership Project (3GPP) Long Term Evolution (LTE) wireless communication system having 7.5 kHz or 15 kHz subcarrier spacing,
wherein, for the 7.5 kHz subcarrier spacing, the OFDM symbol x1 is OFDM symbol 1, the OFDM symbol x2 is OFDM symbol 3 and the OFDM symbol x3 is OFDM symbol 5, and
wherein, for the 15 kHz subcarrier spacing, the OFDM symbol x1 is OFDM symbol 2, the OFDM symbol x2 is OFDM symbol 6 and the OFDM symbol x3 is OFDM symbol 10.

15. A wireless communication device comprising:
a receiver to receive a signal of a wireless communication system; and
a processing device configured to control detecting a fading profile at the wireless communication device,
wherein the processing device is configured to control
estimating signal to noise ratio (SNR) of a reference signal (RS) of a Multicast Broadcast Single Frequency Network (MBSFN) based on a first Orthogonal Frequency Division Multiplexing (OFDM) symbol pair of OFDM symbol x1 and OFDM symbol x2 and a second OFMD symbol pair of the OFDM symbol x1 and OFDM symbol x3, wherein the estimating determines a SNR1 for the first OFDM symbol pair and a SNR2 for the second OFDM symbol pair, and
estimating, based on the SNR1 and the SNR2, the fading profile of a propagation channel to be a MBSFN fading profile or a non-MBSFN fading profile,
wherein the fading profile is estimated based on a difference Delta_SNR=SNR2−SNR1, and
wherein a value of Delta_SNR for which the fading profile is estimated to be the MBSFN fading profile is greater than a value of Delta_SNR for which the fading profile is estimated to be the non-MBSFN fading profile corresponding to a predetermined wireless communication system.

16. The wireless communication device of claim 15,
wherein the processing device is configured to control
determining the SNR1, based on a signal power Ps determined by differential correlation (DC) of a pre-filtered MBSFN RS of the OFDM symbol x1 with a corresponding MBSFN RS of the OFDM symbol x2 and a total symbol power of the pre-filtered MBSFN RSs corresponding respectively to the first OFDM symbol pair, and
determining the SNR2, based on a signal power Ps determined by DC of the pre-filtered MBSFN RS of the OFDM symbol x1 with a corresponding MBSFN RS of the OFDM symbol x3 and a total symbol power of the pre-filtered MBSFN RSs corresponding respectively to the second OFDM symbol pair.

17. The wireless communication device of claim 16,
wherein the processing device is configured to control, when the estimated fading profile is the MBSFN fading profile, channel estimation by filtering of given MBSFN RSs according to the MBSFN fading profile.

* * * * *